(12) United States Patent
Sieg

(10) Patent No.: US 8,705,702 B1
(45) Date of Patent: Apr. 22, 2014

(54) EMERGENCY COMMUNICATIONS SYSTEM

(75) Inventor: Jonathan Sieg, Jamaica Plain, MA (US)

(73) Assignee: GreatCall, Inc., San Diego, CA (US)

( * ) Notice: Subject to any disclaimer, the term of this patent is extended or adjusted under 35 U.S.C. 154(b) by 1706 days.

(21) Appl. No.: 11/745,514

(22) Filed: May 8, 2007

Related U.S. Application Data

(60) Provisional application No. 60/798,643, filed on May 8, 2006.

(51) Int. Cl.
*H04M 11/04* (2006.01)
(52) U.S. Cl.
USPC .......................................... 379/45; 455/456.1
(58) Field of Classification Search
USPC ................. 455/550.1, 404.1; 379/37–45
See application file for complete search history.

(56) References Cited

U.S. PATENT DOCUMENTS

| 2003/0031150 | A1* | 2/2003 | Yukie | 370/349 |
| 2005/0085257 | A1* | 4/2005 | Laird et al. | 455/550.1 |
| 2005/0096067 | A1* | 5/2005 | Martin | 455/456.1 |
| 2005/0253706 | A1* | 11/2005 | Spoltore et al. | 340/541 |
| 2007/0180123 | A1* | 8/2007 | Bennett | 709/227 |
| 2007/0189520 | A1* | 8/2007 | Altberg et al. | 380/30 |
| 2008/0106440 | A1* | 5/2008 | Verma et al. | 341/22 |

* cited by examiner

*Primary Examiner* — Maria El-Zoobi
(74) *Attorney, Agent, or Firm* — Kilpatrick Townsend & Stockton LLP

(57) ABSTRACT

A communications terminal facilitates signaling emergency alerts and monitoring. The terminal is operative in response to user input to generate emergency messages which are transmitted to one or more predetermined recipients via one or more mediums of communication. This user input to generate an emergency is designed such that it takes advantage of the facilities of available common user terminals (e.g. mobile phones, personal digital assistants) and may be augmented by short-range wireless "panic button" devices carried or worn by the user to allow triggering an alarm more effectively and/or conveniently. In response to either direct input from a user or remote input from another, the terminal also transmits audio, video, still image, and other available data that facilitates situation monitoring. The user may also indicate the nature and severity of the situation. Further, the terminal may suppress indications of the established communications such that the terminal appears to be in a dormant state. Further, the terminal may suppress normal handset controls allowing anyone to terminate communication, requiring specific, unique user input to terminate the emergency communication medium(s). Incorrect entry of this unique user input may be used as an indication that the user is in a situation of duress.

41 Claims, 3 Drawing Sheets

EMERGENCY COMMUNICATIONS SYSTEM

CROSS-REFERENCE TO RELATED APPLICATIONS

A claim of priority is made to U.S. Provisional Patent Application No. 60/798,643, entitled METHODS AND APPARATUS FOR EXIGENT MESSAGE GENERATION AND TRANSMISSION, filed May 8, 2006, which is incorporated by reference.

FIELD OF THE INVENTION

This invention is generally related to emergency communications, and more particularly to network devices and modified mobile terminals that facilitate communicating the occurrence of an emergency situation, and subsequent monitoring of the emergency situation.

BACKGROUND OF THE INVENTION

For many subscribers to wireless communications services, one of the justifications for subscribing to the service is the ability to summon assistance in emergency situations. For example, a wireless terminal device such as a mobile phone, personal digital assistant (PDA), or laptop computer could be used to establish communications for requesting assistance when other means of communication are unavailable, e.g., by dialing 911. Such wireless devices are usually adequate for summoning help in response to emergencies of relatively low severity, such as automobile breakdowns and minor accidents. However, the typical wireless terminal device is not particularly well adapted for use in more severe emergencies, such as during a violent crime. For example, even using the 911 system may be impractical in the midst of a robbery or kidnapping because of the lack of time available for dialing, establishing a connection, and describing the nature of the emergency. Further, the perpetrator is likely to recognize that the wireless terminal device is being used to signal for help and take actions to terminate that activity.

SUMMARY OF THE INVENTION

In accordance with one embodiment of the invention, apparatus which facilitates provision of emergency communication services via a via a network, comprises: at least one network device capable of alerting a responder; and a terminal device operable in response to a prompt to establish communications with the at least one network device via the network, the terminal device being further operable to suppress indications of the established communications.

In accordance with another embodiment of the invention, a computer-readable medium has stored thereon a computer program which facilitates provision of emergency communication services via a network, where the program comprises the operational steps of: in response to a prompt, establishing communication between a personal communications device and at least one network device capable of alerting a responder; and suppressing external indications of the established communications by the personal communications device.

Embodiments of the invention may be used to provide a subscription-based service. For example, the service may be provided by, or independent of, the communications service provider normally used by the subscriber for data and voice services.

BRIEF DESCRIPTION OF THE FIGURES

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
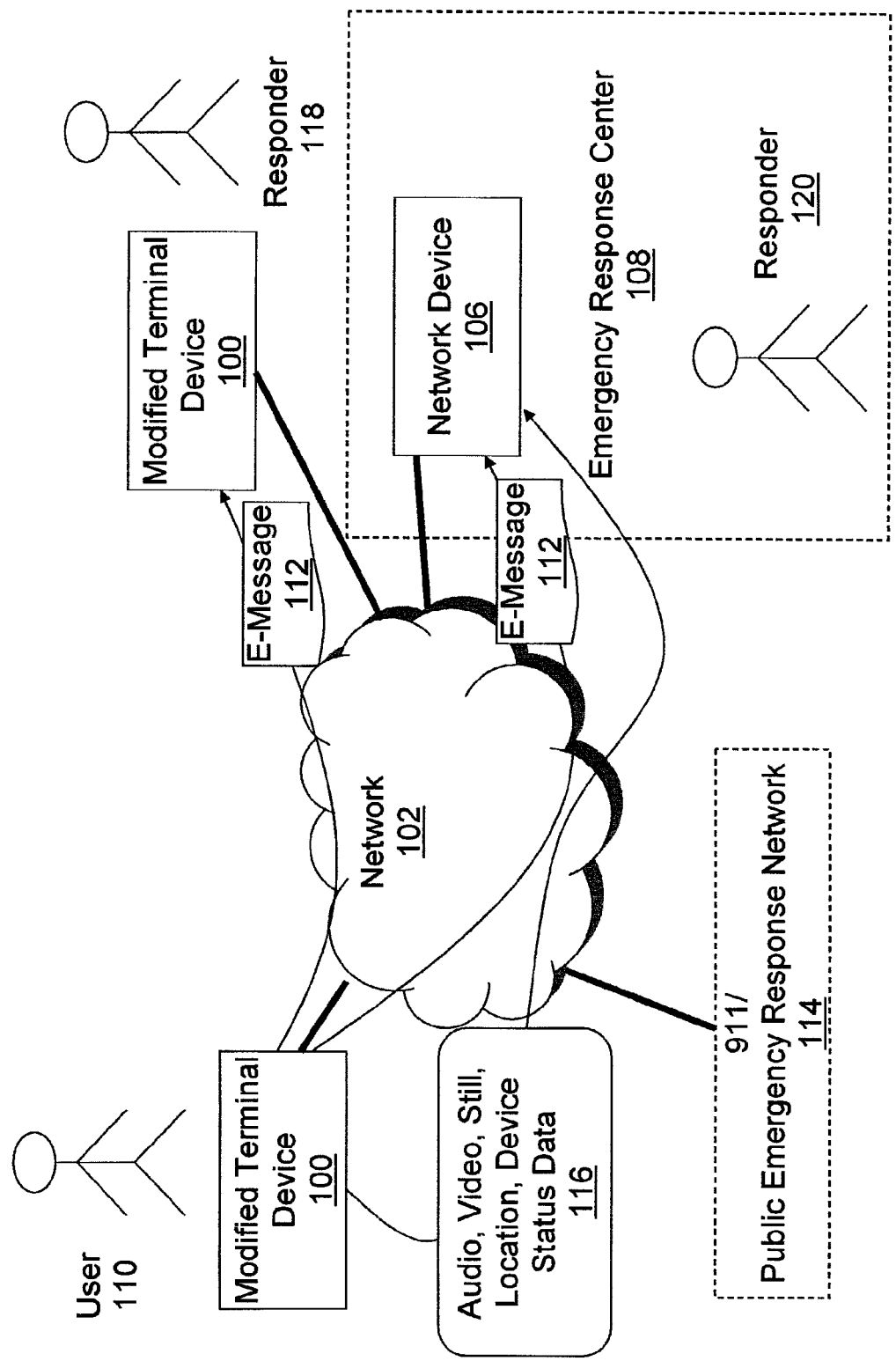
FIG. 1 is a context diagram of an exemplary communications network in accordance with the invention.

Referring to FIG. 1, the invention includes a terminal device, which will typically be a wireless terminal device (100) such as a mobile phone, but may alternatively be a wired phone, PDA, computer, pager, or any other device equipped for network communications. Further, this device may be augmented by communication with another wireless device, such as a Bluetooth® short-range wireless fob or "panic button device." This "panic button device" would be convenient to have at hand, attached to the user's key chain, clothing, purse, brief case, etc., even when the users wireless terminal device (100) is not readily at hand. This "panic button device" would be used to communicate with the wireless terminal device (100) to indicate the occurrence of an exigent event by the User in lieu of direct physical and/or verbal input to the wireless terminal device (100). In this example, Bluetooth®, as the wireless protocol, is used since many mobile handsets incorporate this technology today for attachment of wireless headsets and other devices. In practice, this could be any wireless protocol implemented by the headset including IEEE 802.11 ("WiFi"), etc. Alternately, this "panic button device" could be implemented as a feature on a Bluetooth® wireless or other short-range wireless protocol commercial headset by reprogramming the headset such that one of its buttons implements the "panic button" feature. The wireless terminal device (100) is operable to communicate with other devices via a network (102). The other devices include terminal devices (104) such as wireless and wired phones, PDAs, computers, pagers, and other device equipped for network communications and configured to alert a responder (118), and network devices (106) such as servers, routers and switches configured to alert a responder (120). In the illustrated embodiment, the wireless terminal device (100) is operable to communicate with network devices (106) at an emergency response center (108), and other terminal devices (104) such as wired phones, wireless phones, PDAs, computers, pagers, and other devices that are operated by a responder (118) personally known to the user (110). The wireless terminal device (100) is not necessarily dedicated to emergency communications, and may be a modified version of a wireless terminal device that is normally used for routine communications, but also has emergency communications capability. The emergency communications capability may be implemented as software that is embedded in the wireless terminal device. In particular, the software can be embedded in new terminal devices before sale to the subscriber, or can be downloaded to an already purchased terminal device that supports downloadable software, e.g. mobile handsets based on Symbian, BREW, Window Mobile, Linux or Palm operating systems or handsets that support Java applications. Alternatively, the software may be partially or entirely executed by one or more network devices other than the wireless terminal device.

One embodiment of the emergency communications capability is panic button service. In this embodiment the wireless terminal device (100) is operative in response to user (110) input to transmit one or more emergency messages (112) indicative of the occurrence of an emergency situation, i.e., an alarm. The user input may be verbal, e.g., saying "help" in voice dial mode, or manual, e.g., entering a sequence of n predetermined characters and then pressing the send button. The user input may also indicate the nature of the emergency either verbally or manually. For example, saying "help, fire" into the wireless terminal device could indicate the occurrence of a fire emergency, whereas "help, robbery" could indicate the occurrence of a robbery. If character sequences are used, different sequences could indicate different types of emergencies. The user input may also indicate the severity, and thus urgency, of the emergency. For example, severity could be indicated on a scale of 1 to 3, where 1 indicates extreme severity and 3 indicates relatively mild severity. The severity, too, could be indicated either verbally or manually. Alternatively, the severity of the emergency could be determined from the nature of the emergency. For example, a robbery might automatically be a severity 1 emergency, whereas an automobile breakdown would be a severity 3 emergency. The subscriber might also be permitted to override the automatically assigned severity indicator. Alternately, the input could be provided by the user pushing a button on a supplemental "panic button device" such as a Bluetooth® wireless fob or a specially programmed Bluetooth® wireless headset.

The emergency messages transmitted by the wireless terminal device (100) are automatically directed to multiple destinations, and may be transmitted in different formats, in response to a single event. For example, intended recipients of the emergency messages may include governmental agencies such as the 911 response network (114), a privately operated emergency response center (108), and personal contacts such as responder (118) and other friends, co-workers and relatives. Formats in which the emergency messages may be sent include, without limitation, voice, video, and text. By sending messages to different destinations and in different formats, the likelihood of reaching someone capable of responding in a timely manner is increased. If the wireless terminal device (100) cannot establish a connection during an exigent event then it will repeatedly attempt to establish connections to transmit the emergency messages. This may include finding and utilizing alternate network access, such as a WiFi (IEEE 802.11x protocols) or WiMax (IEEE 802.16x) network when a cellular network is unavailable. Until the emergency message data is transferred, it is held in local storage on the wireless terminal device.

A variant of the alarm emergency message is an alert emergency message (112). In particular, the user (110), i.e., subscriber, can trigger transmission of an alert message to indicate an increased likelihood of an emergency, rather than the actual occurrence of the emergency (such as with "pan-pan" versus "mayday"). This allows potential responders time to prepare to render assistance before an emergency occurs. It may also prompt use of special features such as position determination and tracking. The alert message can be upgraded to an alarm message by further user input such as already described above, although the nature and severity may not necessarily have to be entered again.

Another embodiment of the emergency communications capability is an emergency monitoring mode. The wireless terminal device (100) may be placed in emergency monitoring mode either automatically in response to transmission of an alarm or alert message, or independently in response to user (110) input, or in response to signaling from a network device (106) associated with a trusted service, such as the emergency response center (106). In the monitoring mode, the sensor inputs of the wireless terminal device (100) are activated to provide real time information (116) to a predetermined recipient, such as a responder (120) at the emergency response center (108). For example, the information may include audio, still image and video data (116) and any other capabilities of the wireless terminal device (100) which can be activated so that the responder can monitor the emergency and determine what actions to take in response.

In order to decrease the likelihood that a perpetrator will recognize that the wireless terminal device (100) is being utilized for emergency communications, the wireless terminal device may be made to appear to be in a dormant or inactive mode (either turned "off," or "on" but not in active use) by suppressing external indicators in response to initiation of emergency communications. For example, communications and monitoring may be done via a one-way (half-duplex) connection between the wireless terminal device and the emergency response center such that the responder can hear sounds within range of the terminal device, but the perpetrator cannot hear the responder. Further, even while transmitting messages, audio and video, the wireless terminal device may suppress either activity or changes to speakers, vibration features, lights and display screens. Alternately, the protocol could be to attempt to establish two-way communication with the user as soon as the user indicates there is an exigent event occurring, by establishing a call with the emergency response center, optionally putting the user's terminal device (100) into a "speakerphone" or "hands-free" mode and attempting to establish verbal communication.

Emergency communications features may be terminated in accordance with techniques such as those used to initiate emergency communications. For example, pressing the "end" button, pressing a predetermined sequence of M-digits and pressing "send," or voice input could be used to cause the wireless terminal device to return to normal operation, or reconfigure for two-way communications while remaining connected to the emergency response center. To help avoid undesirable termination of services by a subscriber under duress, the subscriber may be required to provide a personal password or phrase to a responder at the emergency response center in order to terminate emergency communications. Entry of an incorrect password, sequence or phrase may prompt automatic escalation of the indicated severity, and cause the wireless terminal device to mimic entry into an inactive mode while maintaining a connection to the operations center. Alternately, or in addition to the above, the means of entering the termination command may be via a menu on the user's terminal (100), which in turn, transmits the "all clear" to the operations center and initiates termination of the established communication channel(s). A predetermined false password, sequence or phrase can also be used to indicate that the subscriber is being directed to disable the terminal device under duress. To prevent excessive false alarms, the service could require the false response to be different from the correct one by multiple letters/digits.

An example of use of the features described above will now be given to provide operational context. In this example, a subscriber is with a modified Blackberry wireless terminal device. The subscriber travels to a location known to be relatively dangerous. The car in which the subscriber is traveling is stopped at an unofficial roadblock setup by an armed group. Concerned, the subscriber enters a first sequence of n-digits and presses send. In response, the blackberry sends email and SMS messages to pre-determined addresses while establishing a one-way connection to the emergency response center. An operator (responder (118)) at the emergency response center hears any sounds which the Blackberry detects, and sees what the Blackberry camera detects. Any available GPS, triangulation, or other location-determining capabilities of the Blackberry and network are utilized to determine the location of the user. If the subscriber is taken away, the Blackberry continues to transmit alarm messages and to transmit sound and images, while appearing to be inoperative. If the event turns out to be a false alarm, the subscriber presses "end," the second M-digit sequence and "send" once the car is underway again, and verbally notifies the responder at the emergency response center that all is well. Corresponding text or pre-recorded voice messages indicating that all is well may also be sent to all of the secondary addresses that have been receiving alarm messages.

Another embodiment of the emergency communications capability is panic button service with emergency response center (108) control capability. In this embodiment the emergency response center, or other designee, is permitted to remotely activate and control the wireless terminal device (100). This may be done while suppressing external indications of activity by the wireless terminal device (100). For example, ringing and display features may be suppressed. The timing and frequency of remote activation may be set by the subscriber, either from the terminal device or other means, in order that a responder can to attempt to determine, from audio and camera inputs, whether all is still well. A variation on this embodiment is a dead man switch mode in which the wireless terminal device (100) operates as usual provided the user periodically provides a predetermined input, e.g., a key sequence at intervals not exceeding two hours. If the predetermined input is not received within the predetermined interval, the wireless terminal device is automatically connected with the emergency response center in a monitoring mode.

Another embodiment of the emergency communications capability is a help service for mobile communications. In this embodiment the predetermined user input, e.g., sequence of n digits or pushing the button on a wireless "panic button device," prompts immediate two-way communication with a help desk of the emergency response center (108). The wireless terminal device may also send identifying information which, in conjunction with a database maintained by the emergency response center, provides a detailed profile of the user to the help desk operator. Subscribers would have the ability to enter personal information such as data, photos and preferences, into a personal file in an exigent database. This would only be accessed in an exigent event to facilitate "rescuing" a subscriber. At any time the subscriber can prompt the wireless terminal device to enter panic button mode by providing a predetermined input, resulting in the disabling of indicators of activity and reconfiguration to half-duplex mode so that the operator can continue to monitor the situation discretely. Alternately, the agreed upon protocol could attempt to establish verbal communication in a 2-way communication channel (voice and/or data/text message). As already described, the user can terminate the panic button mode with a predetermined input. In the context of the previous example, the user would establish a call to the help desk while approaching the roadblock, and only cause the wireless terminal device to enter the panic button mode when asked to exit the car for a search. In another example, the help service feature could be utilized where the user is in an automobile accident or has a medical emergency. In this example the user wants to talk to somebody and get help, and the identification information and database provides useful information about medical history, itinerary, etc. Since the user is not being threatened by anyone, there is no need to hide indications of emergency communication.

As an exemplary business model, configurations herein may be employed in a manner which adds $n/month per subscriber plus a setup and maintenance fee by the emergency service bureau. Alternately devices can be sold to individuals or companies that program the contact numbers independent of any service provider.

Figure 2:
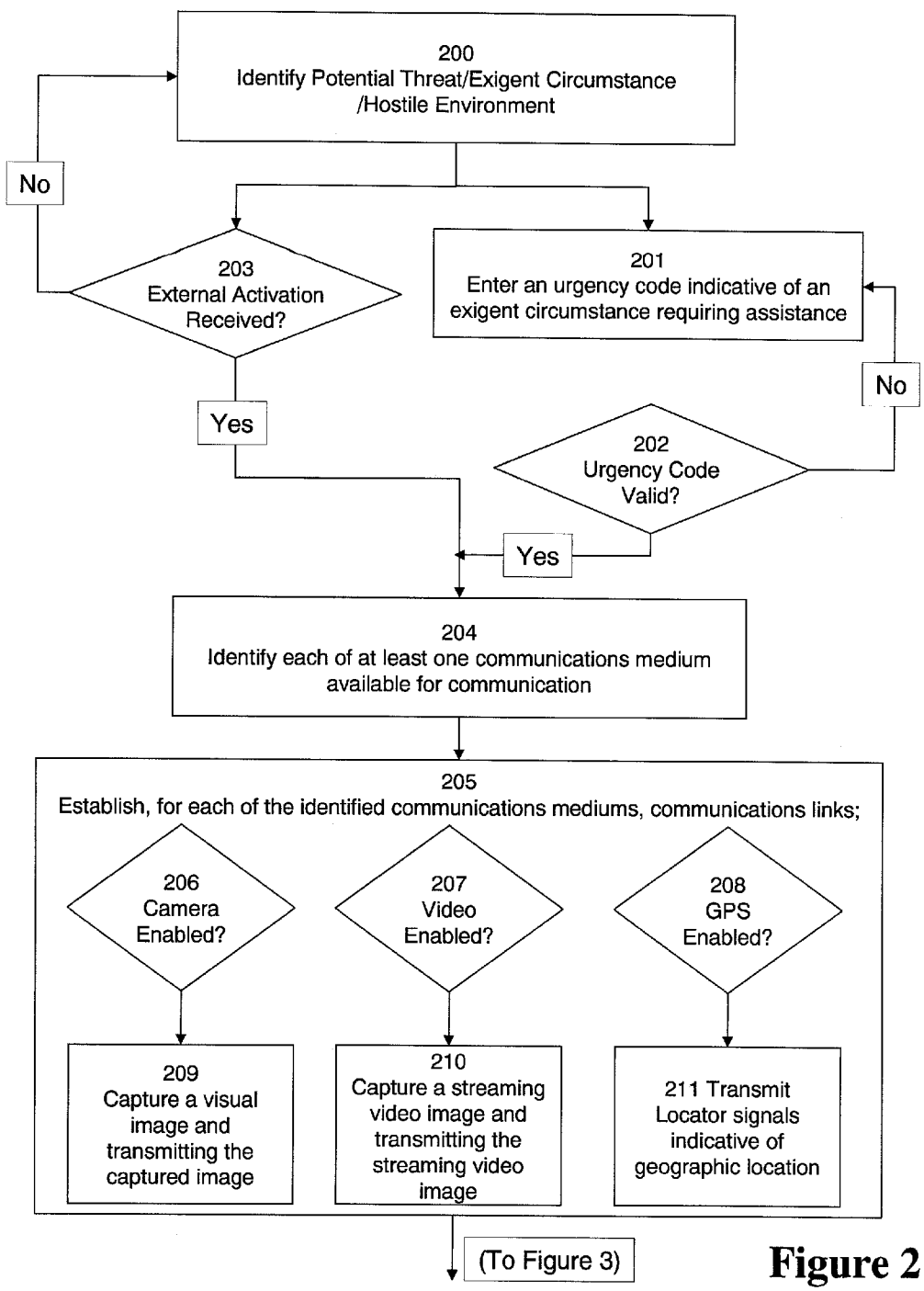
FIGS. 2 and 3 are flowcharts of exigent message generation and transmission in the environment of FIG. 1.
Figure 3:
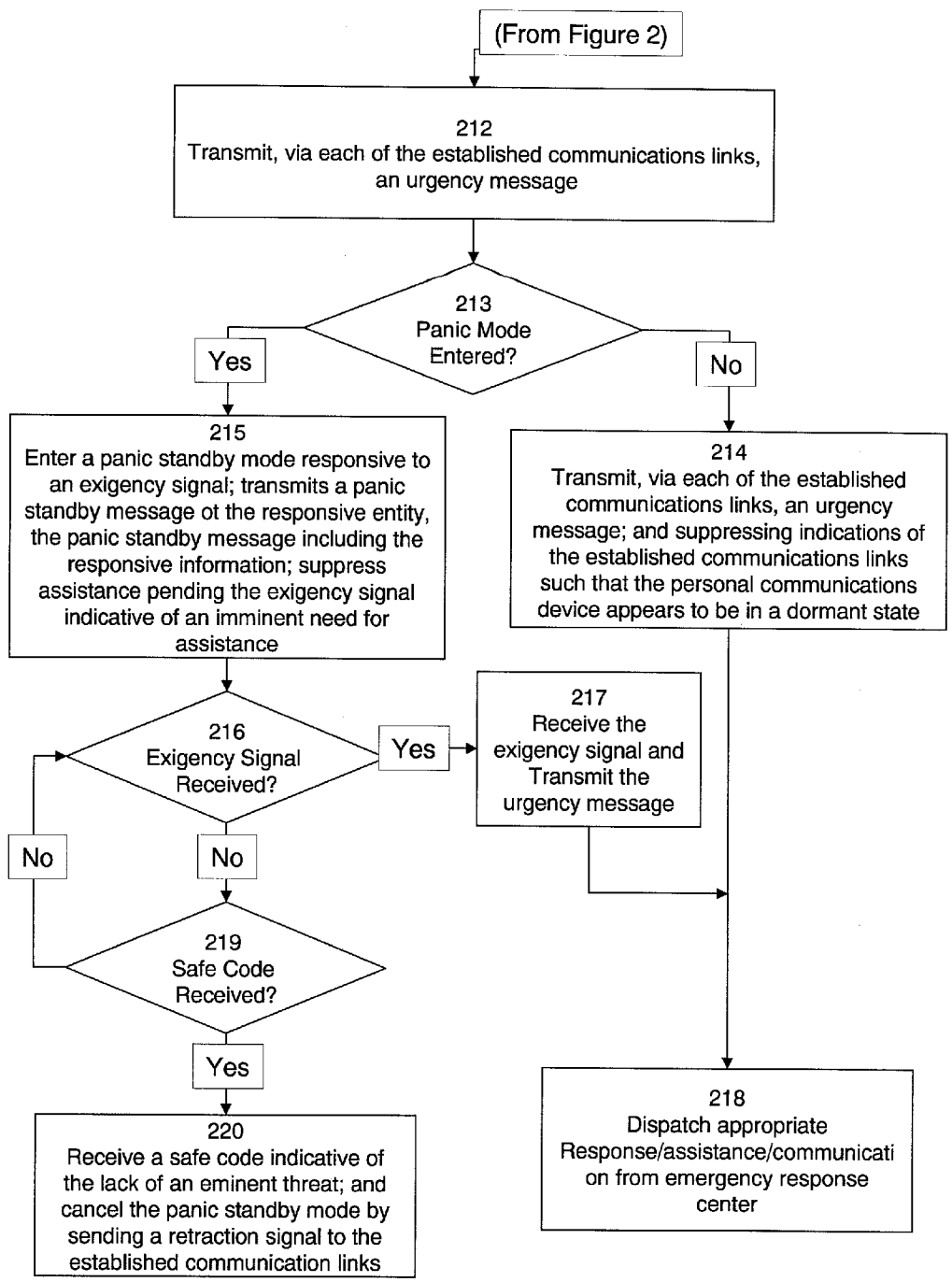

FIGS. 2 and 3 illustrate process flow for one embodiment. An initiating step (200) is to identify a potential threat, exigent circumstance, or hostile environment. In response to step (200), a determination is made whether external activation was received identifying the nature of the exigent circumstance, as indicated by step (203). If external activation was not received, flow returns to step (200). If external activation was received, flow moves to step (204) where at least one communications medium available for use is identified. Step (200) is also followed by step (201), in which the user is prompted to enter an urgency code indicative of an exigent circumstance requiring assistance. The code is checked for validity in step (202), and if invalid the user is again prompted. If the code is valid, flow moves to step (204). Once the available communications mediums are identified in step (204), communications links are established for those mediums in step (205). If a camera is enabled, as determined in step (206), at least one visual image is captured and transmitted as indicated by step (209). If a video capability is enabled, as determined in step (207), a streaming video image is captured and transmitted as indicated by step (210). If a GPS capability is enabled, as determined in step (208), locator signals indicative of geographic location are transmitted as indicated by step (211). Further, step (2008) could be augmented to include other potentially information besides location, such as the signal strength and battery life of the user's terminal (100). Most basically, either full-duplex or half-duplex (from user to Emergency Response Center) voice and/or text messages communication as determined in step (208*a*) and transmitted as indicated in step (211*a*). Further, since voice mediums for cellular networks often become overloaded during large emergencies (such as the Sep. 11, 2001 World Trade Center disaster) the service will fall back to more robust text and Short Message System (SMS, e.g. "text") communication. Further, in falling back, the implementation may use the facilities of the user's terminal (100) and associated software to perform speech-to-text conversions allowing voice communication over what is normally a text-only medium. Further, this could be alternately implemented on a data channel of sufficient bandwidth as a voice over data (e.g. Voice over IP or VoIP) communication. Further, when sufficient data bandwidth for live transmission of data-encoded voice is not available, the system could fall back to parsing the voice into a store-and-forward mode that mimics real-time communication or a store-and-forward mode that acts in half-duplex mode. An urgency message is then transmitted via each of the established communications links, as indicated by step (212). If a panic mode prompt has been entered, as determined in step (213), the wireless terminal device enters panic standby mode (suppressing external device indicators), transmits a panic standby message to the emergency response center, and suppresses the exigency signal as indicated in step (215). If the panic mode prompt has not been entered, as determined in step (213), the wireless terminal device transmits an urgency message via each of the established communication links, and suppresses indications of the established communications links such that the device appears dormant, as indicated in step (214). Following step (215), if an exigency signal has been received, as determined in step (216), an urgency message is transmitted as indicated in step 217, and the emergency response center responds accordingly, as indicated in step (218). If the exigency signal was not received, as determined in step (216), and the safe code was not received, as determined in step (219), flow loops. If the safe code is received, the panic standby mode is cancelled as indicated in step (220).

Those skilled in the art should readily appreciate that the described embodiments are deliverable in many forms, including but not limited to a) information permanently stored on non-writeable storage media such as ROM devices, b) information alterably stored on writeable storage media such as floppy disks, magnetic tapes, CDs, RAM devices, and other magnetic and optical media, and c) information conveyed to a computer through communication media. The operations and methods may be implemented by the device itself, or in network software executed partially or completely remotely from the device. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A non-transitory computer-readable medium having stored thereon a computer program which facilitates provision of emergency communication services via a network, the program comprising the operational steps of:
   in response to a prompt, establishing communication between a personal communications device and at least one network device capable of alerting a responder;
   providing from the personal communications device to the at least one network device an indication of a severity of exigent circumstance; and
   suppressing external indications of the established communications by the personal communications device.

2. The non-transitory computer-readable medium of claim 1 wherein the prompt is a key sequence entered by a user.

3. The non-transitory computer-readable medium of claim 1 wherein the prompt is verbally entered by a user.

4. The non-transitory computer-readable medium of claim 1 wherein the prompt is remotely entered relative to the personal communications device.

5. The non-transitory computer-readable medium of claim 1 further including providing an indication of type of exigent circumstance.

6. The non-transitory computer-readable medium of claim 1 further including establishing communications over a plurality of different communications mediums.

7. The non-transitory computer-readable medium of claim 6 further including transmitting, via each communications medium, an emergency message.

8. The non-transitory computer-readable medium of claim 7 wherein the emergency message includes information which identifies a subscriber.

9. The non-transitory computer-readable medium of claim 8 wherein the at least one network device includes a server, switch, router, computer, wired phone, wireless phone, personal digital assistant, or combinations thereof.

10. The non-transitory computer-readable medium of claim 1 further including capturing audio and transmitting the captured audio via the established communications.

11. The non-transitory computer-readable medium of claim 1 further including capturing a visual image and transmitting the captured image via the established communications.

12. The non-transitory computer-readable medium of claim 1 further including capturing a streaming video image and transmitting the streaming video image via the established communications.

13. The non-transitory computer-readable medium of claim 1 further including transmitting locator signals indicative of a geographic location of the personal communications device.

14. The non-transitory computer-readable medium of claim 1 further including maintaining the communications in a half-duplex mode.

15. The non-transitory computer-readable medium of claim 1 further including disabling audible and visual indicators of active communications.

16. The non-transitory computer-readable medium of claim 1 wherein the personal communications device is responsive to a status query to discreetly activate a communications medium without generating external stimuli indicative of such communication.

17. A system which facilitates provision of emergency communication services via a network, comprising:
   at least one network device capable of alerting a responder; and
   a personal communications device operable in response to a prompt to establish communications with the at least one network device via the network, the personal communications device being further operable to suppress indications of the established communications and to provide to the at least one network device an indication of a severity of exigent circumstance.

18. The system of claim 17 wherein the prompt is a key sequence entered by a user or via a "panic button device".

19. The system of claim 17 wherein the prompt is verbally entered by a user.

20. The system of claim 17 wherein the prompt is remotely entered relative to the personal communications device.

21. The system of claim 17 wherein the personal communications device is operable to provide an indication of type of exigent circumstance.

22. The system of claim 17 wherein the personal communications device is operable to establish communications via a plurality of different communications mediums.

23. The system of claim 22 wherein the personal communications device is operable to transmit, via each of the established communications, an emergency message.

24. The system of claim 23 wherein the emergency message includes information which identifies a subscriber.

25. The system of claim 24 wherein the at least one network device includes a server, switch, router, computer, wired phone, wireless phone, personal digital assistant, or combinations thereof.

26. The system of claim 17 wherein the personal communications device is operable to capture audio and transmit the captured audio via the established communications.

27. The system of claim 17 wherein the personal communications device is operable to capture a visual image and transmit the captured image via the established communications.

28. The system of claim 17 wherein the personal communications device is operable to capture a streaming video image and transmit the streaming video image via the established communications.

29. The system of claim 17 wherein the personal communications device is operable to transmit locator signals indicative of a geographic location of the personal communications device.

30. The system of claim 17 wherein the personal communications device is operable to maintain the communications in a half-duplex mode.

31. The system of claim 17 wherein the personal communications device is operable to maintain the communications in a half-duplex or full-duplex mode for purposed of establishing voice or text communication.

32. The system of claim 17 wherein the personal communications device is operable to disable audible and visual indicators of active communication.

33. The system of claim 17 wherein the personal communications device is responsive to a status query to discreetly activate a communications medium without generating external stimuli indicative of such communication.

34. The system of claim 18, wherein the "panic button device" is a key fob that communicates using a wireless protocol.

35. A non-transitory computer-readable medium having stored thereon a computer program which facilitates provision of emergency communication services via a network, the program comprising the operational steps of:
in response to a prompt, attempting to establish communication via a voice communication channel over a network between a personal communications device and at least one network device capable of alerting a responder;
detecting that the attempt to establish communication via the voice communication channel between the personal communications device and the at least one network device failed;
in response to detecting that the attempt to establish communication via the voice communication channel between the personal communications device and the at least one network device failed, establishing communication via an alternate text-based communication channel over the network between the personal communications device and the at least one network device;
suppressing external indications of the established communications by the personal communications device;
ceasing to suppress external indications of the established communications by the personal communications device only upon receipt of a previously-defined entry; and
recognizing an entry that does not match the pre-defined entry, and in response causing the personal communications device to appear to be turned off while maintaining the established communications and suppressing external indications of the established communications.

36. The non-transitory computer-readable medium of claim 35, wherein establishing communication via an alternate text-based communication channel between the personal communications device and the at least one network device comprises sending a short message service message.

37. The non-transitory computer-readable medium of claim 35, wherein the program comprises the operational step of performing a speech-to-text conversion of voice input and transmitting the resulting text over the text-based communication channel.

38. A non-transitory computer-readable medium having stored thereon a computer program which facilitates provision of emergency communication services via a network, the program comprising the operational steps of:
in response to a prompt, establishing communication between a personal communications device and at least one network device capable of alerting a responder;
suppressing external indications of the established communications by the personal communications device;
ceasing to suppress external indications of the established communications by the personal communications device only upon receipt of a previously-defined entry; and
recognizing an entry that does not match the pre-defined entry, and in response causing the personal communications device to appear to be turned off while maintaining the established communications and suppressing external indications of the established communications.

39. A system which facilitates provision of emergency communication services via a network, comprising:
at least one network device capable of alerting a responder; and
a personal communications device operable in response to a prompt to:
attempt to establish communications via a voice communication channel over a network with the at least one network device via the network;
detect that the attempt to establish communication via the voice communication channel between the personal communications device and the at least one network device failed;
in response to the detection that the attempt to establish communication via the voice communication channel between the personal communications device and the at least one network device failed, establish communication via an alternate text-based communication channel over the network between the personal communications device and the at least one network device;
suppress indications of the established communications;
cease to suppress external indications of the established communications by the personal communications device only upon receipt of a previously-defined entry; and
recognize an entry that does not match the pre-defined entry, and in response cause the personal communications device to appear to be turned off while maintaining the established communications and suppressing external indications of the established communications.

40. The system of claim 39, wherein the personal communications device is operable to perform a speech-to-text conversion of voice input and transmit the resulting text over the text-based communication channel.

41. A system which facilitates provision of emergency communication services via a network, comprising:
at least one network device capable of alerting a responder; and
a personal communications device operable in response to a prompt to establish communications with the at least one network device via the network, the terminal device being further operable to suppress indications of the established communications and to cease suppression of external indications of the established communications by the personal communications device only upon receipt of a previously-defined entry, and the personal communications device being further operable to recognize an entry that does not match the pre-defined entry, and in response appear to be turned off while maintaining the established communications and suppressing indications of the established communications.

* * * * *